United States Patent [19]
Hulyalkar et al.

[11] Patent Number: 5,787,080
[45] Date of Patent: Jul. 28, 1998

[54] METHOD AND APPARATUS FOR RESERVATION-BASED WIRELESS-ATM LOCAL AREA NETWORK

[75] Inventors: Samir N. Hulyalkar, Columbia, Md.; Chiu Y. Ngo, Ossining, N.Y.

[73] Assignee: Philips Electronics North America Corporation, New York, N.Y.

[21] Appl. No.: 656,803

[22] Filed: Jun. 3, 1996

[51] Int. Cl.$^6$ .................. H04B 7/212; H04L 12/28; H04L 12/56
[52] U.S. Cl. .................. 370/348; 370/395
[58] Field of Search .................. 370/310, 321, 370/322, 328, 329, 330, 337, 338, 347, 348, 395, 396, 397, 398, 399, 409, 468

[56] References Cited

U.S. PATENT DOCUMENTS

| | | | |
|---|---|---|---|
| 5,046,066 | 9/1991 | Messenger. | |
| 5,297,144 | 3/1994 | Gilbert et al.. | |
| 5,471,469 | 11/1995 | Flammer et al.. | |
| 5,570,355 | 10/1996 | Daid et al. | 370/395 |
| 5,572,517 | 11/1996 | Safadi | 375/257 |
| 5,633,869 | 5/1997 | Burnett et al. | 370/396 |
| 5,638,371 | 6/1997 | Raychaudhuri et al. | 370/395 |
| 5,648,958 | 7/1997 | Counterman | 370/458 |

FOREIGN PATENT DOCUMENTS

0483546A1 6/1992 European Pat. Off..

OTHER PUBLICATIONS

"Hiperlan: The High Performance Radio Local Area Network Standard", by G.A. Halls, Elec. & Comm. Eng. Journal, Dec. 1994, pp. 289–296.

ICC Conference Record vol. 2 of 3, Jun. 19–22 1983, pp. 754–759.

ICC77 Conference Record vol. 2 of 3, Jun. 12–15 1977, pp. 22.1-105 ... 22.1-111.

"Wireless Trends in 21st Century", by D. Petras et al, 1995 Wireless Communication Systems Symposium, Nov. 28 and 29, 1995.

"ATM Local Area Networks Using Distributed Switch Architecture", Y. Du et al. IEEE, 1994, pp. 1832–1837.

"ATM-Based Transport Architecture for Multiservices Wireless Personal Communication Networks", D. Raychaudhuri, IEEE Journal on Selected Areas in Communications, vol. 12, No. 8, Oct. 1994, pp. 1401–1414.

*Primary Examiner*—Ajit Patel
*Attorney, Agent, or Firm*—Steven R. Biren

[57] ABSTRACT

A reservation-based wireless asynchronous transfer mode (ATM) local area network includes a system architecture of mobile nodes (MNs), each MN for communicating with various ones of the other MNs. A plurality of services is supported wherein each service has respective quality-of-service (QoS) requirements. A medium access control (MAC) layer using a reservation-based communications protocol is provided, wherein the protocol divides all MAC-based communications between a control channel and a data channel, the control channel and the data channel together making up a control-data superframe (CDS). The protocol further utilizes the control channel for allocating a bandwidth of the data channel to each service. The control channel includes a control frame during which an allocation of data payload slots of the data channel is determined according to (a) a long-term strategy corresponding to a time of service required to complete a service over multiple CDS frames and (b) a short-term strategy within a CDS frame corresponding to instantaneous data payload slot requirements for a particular service. Respective QoS requirements of each service are thus achieved.

26 Claims, 4 Drawing Sheets

IPS – INTER-PHASE SPACE

METHOD AND APPARATUS FOR RESERVATION-BASED WIRELESS-ATM LOCAL AREA NETWORK

BACKGROUND OF THE INVENTION

1. Field of the Invention

This invention generally relates to a method and apparatus for a wireless asynchronous transfer mode local area network, and more particularly, to a method and apparatus for implementing a reservation-based wireless asynchronous transfer mode local area network.

2. Discussion of the Related Art

The success of Global Satellite Mobile (GSM) systems establishes wireless communications as indispensable in modern life. While GSM has targeted only voice communications, the future communications content is clearly multimedia in nature. With respect to multimedia communications, asynchronous transfer mode (ATM) technology has been developed over wired networks to deal with high-speed data with different data rates, different quality-of-service (QoS) requirements, and different connection or connectionless paradigms, etc. QoS requirements may include, for example, data reliability, delay considerations, and/or other requirements. It is then natural to assume an emergence of a combination of wireless and ATM-based service at a consumer end of a wired network. Such a combination has the potential to open up a major multimedia communications market for the home or business.

Existing efforts of building a wireless local area network (LAN) are focussed around emerging standards of the IEEE 802.11 in US and the HIPERLAN in Europe. It is noted that these standards are nearing maturity, however, their development did not take into consideration ATM-based service requirements of QoS guarantees for both real-time and data traffic. Essentially, the ATM-based service requirements come about by multiplexing video, audio, and data services (i.e., multimedia) in the same medium. Audio data does not require the packet-error reliability required of data services, but audio data cannot tolerate excessive delay. Video data can in general suffer more delay than audio; however, video data is intolerant to delay jitter. These delay and packet-error rate considerations were essentially what forced ATM to adopt a connection-oriented service. The delay and packet-error rate considerations also forced error-control to be done end-to-end, instead of implementing error-control between every two nodes within a specified connection. Error-control is a method of ensuring reliability of packets at a node, whereupon a detection of a packet error at a node results in a packet retransmission request being sent to the transmitting node. Such a strategy was feasible with wired fiber-optic networks which have a very small packet error rate. In contrast, wireless networks generally do not provide such low packet error rates.

Delay considerations are also important for ATM service. For instance, a wired ATM network will operate to simply block any services for which it cannot guarantee a required QoS. On the other hand, wireless networks typically do not allow such a feature of blocking any service for which it cannot guarantee a required QoS. Consider for instance the example of telephone service. It would be desirable for the telephone service to be blocked if the required QoS requirements cannot be met, since it is believed that one would rather prefer to have a call blocked than to have a call interrupted by a wireless network's inability to meet the required QoS requirements. Absent the feature of blocking a service for which the network cannot guarantee the required QoS, the delay incurred in the wireless ATM network can actually increase exponentially in an overloaded network. Such a channel-access protocol regarding the blocking of a service for which a wireless ATM network cannot guarantee a required QoS is not addressed in the IEEE 802.11 and the HIPERLAN standards.

Services which are supported over an ATM network have certain characteristics with regard to a time-varying feature of the data rate of service. For instance, a service may include a variable data rate. In addition, for each service, corresponding QoS parameters are expected to be sustained by the ATM network. Typical characteristics and corresponding QoS parameters for a given service may include the following:

Constant Bit Rate (CBR): a bit rate is specified.

Variable Bit Rate—Restricted Transmission time (VBR—RT): a sustained cell rate, maximum burst size, and bounded delay are specified.

Variable Bit Rate—Non-Restricted Transmission time (VBR—NRT): a sustained cell rate and maximum burst size are specified.

Available Bit Rate (ABR): best effort service—no bandwidth guarantees except for a minimum rate negotiation (i.e., no specific bandwidth allocation).

Unspecified Bit Rate (UBR): ABR without any guaranteed rate.

An important issue for consideration in the design of a wireless-ATM system is that the Medium Access Control (MAC) protocol, which specifies the method of access to the wireless channel among multiple users, must satisfy the basic requirements of ATM. As discussed above, one of the ATM requirements is that a wireless network must provide a quality-of-service (QoS) in terms of guaranteed bandwidth (among other criterion of cell-loss probability, delay considerations, etc.) for services such as CBR and VBR. It would thus be desirable to for the MAC protocol to enable system users to reserve space for their respective services and transmissions within the wireless network. Furthermore, it would be desirable that the reserved space be present for the entire duration of the service for each user.

In light of the above, two distinct channels should be available to each user. The first channel includes a "control" channel which serves for implementing a reservation method. The second channel includes a "data" channel where each user can send data without having conflicts with other users. Such a reservation-based MAC protocol is thus essential for delivery of ATM cells over a wireless network. One reservation method which has been proposed for wireless ATM is described in the article "ATM Based Transport Architecture for Multiservices Wireless Personal Communication Networks", by D. Raychaudhri and N. Wilson, IEEE JSAC, pp. 1401–1414, October 1994. In the cited article, the reservation method fails to teach or suggest a method by which different users can specify different "bandwidths" for different periods and/or various lengths of time.

In addition to the above, implementation of control and data channels depends upon a chosen network architecture. Essentially, there are two kinds of wireless network architectures, that is, centralized (or base-station oriented) architecture and distributed (or ad-hoc oriented) architecture. The two types of wireless network architectures shall be briefly described in the following with reference to FIGS. 1(a) and 1(b).

Centralized (base-station based) architecture has been used for years in cellular communications, e.g., GSM. In the case of GSM, service areas are divided into small regions, called "cells." Each cell is served by a specific base station (BS) 12. Communications between different mobile terminals (MTs) 14 are done via BSs 12 and/or a mobile switching center (MSC) 16. Centralized architecture is further characterized by two different topologies, namely, tree topology and ring topology, as exemplified in FIG. 1(a) and FIG. 1(b), respectively. In the tree topology 10, the switching function is performed in a "hierarchical" manner. While switching for intra-cell calls is done in the respective BS 12, switching for inter-cell calls is conducted in the respective MSC 16. Normally, the switch in the MSC 16 is more sophisticated and complex than those in the BSs 12. In the ring topology 20, the switching function is performed in a "distributed" manner. That is, while switching for intra-cell calls is done in the BS 12 as in the tree topology, switching for inter-cell calls is conducted by passing the call to the destined BS switch around the ring. Unlike the tree topology, the ring topology 20 uses identical BSs 12 and switches which makes it much easier to be scalable. Such a ring topology is described, for instance, in the article "ATM Local Area Networks Using Distributed Switch Architecture" by Y. Du, and R. Kraemer, Globecom'94, November 1994.

Making reference now to FIGS. 2(a) and 2(b), unlike the centralized architecture, a distributed (ad-hoc) architecture does not require any base station. Instead, each of the mobile nodes (MNs) 32 has its own capability to perform switching as well as communicate directly with other MNs 32 of the distributed architecture. All of the MNs 32 together form an ad-hoc network, such as described in the HIPERLAN and IEEE 802.11 standards. In an ad-hoc network, there are essentially two types of topologies, namely, a fully-connected topology (FCT) and a forwarding-node topology (FNT), as exemplified in FIG. 2(a) and FIG. 2(b), respectively. In the fully-connected topology (FCT) 30, all devices at home are assumed to be able to talk to each other. Sufficient power is assumed to be used by a device such that it can maintain a link with every other device. In the forwarding-node topology (FNT) 40, not all devices can talk to each other. The home is then partitioned into partially-connected "cells" with some of the mobile nodes being designated as forwarding nodes 34.

SUMMARY OF THE INVENTION

An object of the present invention is to overcome the problems in the art discussed above.

Another object of the present invention is to provide a MAC protocol which enables system users to reserve space for their respective services and transmissions within the wireless network, wherein the reserved space is present for an entire duration of a respective service for each user.

According to the present invention, a method for implementing a reservation-based wireless asynchronous transfer mode (ATM) local area network (LAN) includes the steps of: a) providing a system architecture of mobile nodes (MNs), each MN for communicating with various ones of the other MNs; b) supporting a plurality of services, each service having respective quality-of-service (QoS) requirements; and c) implementing a medium access control (MAC) layer using a reservation-based communications protocol, wherein the protocol (i) divides all MAC-based communications between a control channel and a data channel, wherein the control channel and the data channel together comprise a control-data superframe (CDS) and (ii) utilizes the control channel for allocating a bandwidth of the data channel to each service, the control channel having a control frame during which an allocation of data payload slots of the data channel is determined according to (a) a long-term strategy corresponding to a time of service required to complete a service over multiple CDS frames and (b) a short-term strategy within a CDS frame corresponding to instantaneous data payload slot requirements for a particular service, thereby achieving respective QoS requirements of each service.

In addition, according to the present invention, a reservation-based wireless asynchronous transfer mode (ATM) local area network includes a system architecture of mobile nodes (MNs), each MN for communicating with various ones of the other MNs. A plurality of services is supported wherein each service has respective quality-of-service (QoS) requirements. A medium access control (MAC) layer using a reservation-based communications protocol is provided, wherein the protocol divides all MAC-based communications between a control channel and a data channel, the control channel and the data channel together making up a control-data superframe (CDS). The protocol further utilizes the control channel for allocating a bandwidth of the data channel to each service. The control channel includes a control frame during which an allocation of data payload slots of the data channel is determined according to (a) a long-term strategy corresponding to a time of service required to complete a service over multiple CDS frames and (b) a short-term strategy within a CDS frame corresponding to instantaneous data payload slot requirements for a particular service. Respective QoS requirements of each service are thus achieved.

Still further, in accordance with the present invention, a mobile node (MN) for use in a reservation-based wireless asynchronous transfer mode (ATM) local area network (LAN) having a system architecture and supporting a plurality of services, each service having respective quality-of-service (QoS) requirements is disclosed. The mobile node includes a medium access control (MAC) layer using a reservation-based communications protocol, wherein the protocol (i) divides all MAC-based communications between a control channel and a data channel, wherein the control channel and the data channel together comprise a control-data superframe (CDS) and (ii) utilizes the control channel for allocating a bandwidth of the data channel to each service, the control channel having a control frame during which an allocation of data payload slots of the data channel is determined according to (a) a long-term strategy corresponding to a time of service required to complete a service over multiple CDS frames and (b) a short-term strategy within a CDS corresponding to instantaneous data payload slot requirements for a particular service, thereby achieving respective QoS requirements of each service.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings in which like reference numerals are carried forward, and in which.

DETAILED DESCRIPTION OF THE PREFERRED EMBODIMENTS

Figure 1A:
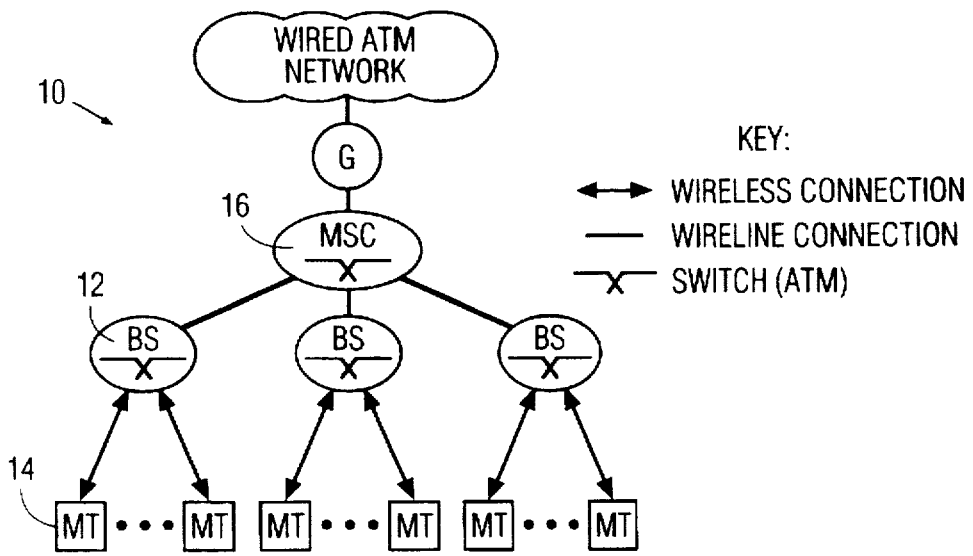
FIG. 1(a) and 1(b) illustrate a wired ATM local area network having a centralized (base-station-based) architecture in a tree topology and a ring topology, respectively.
Figure 1B:
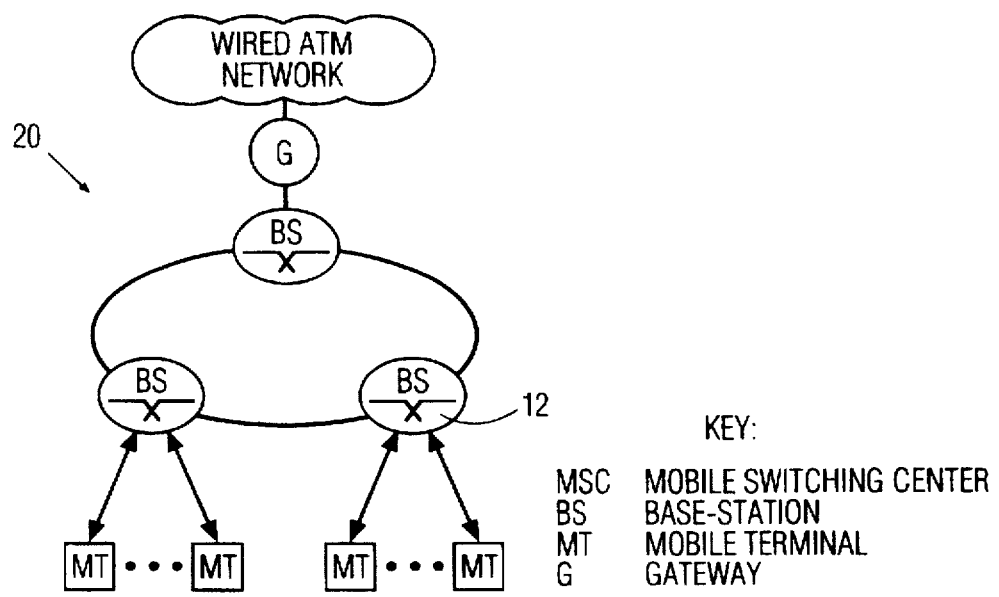
Figure 2A:
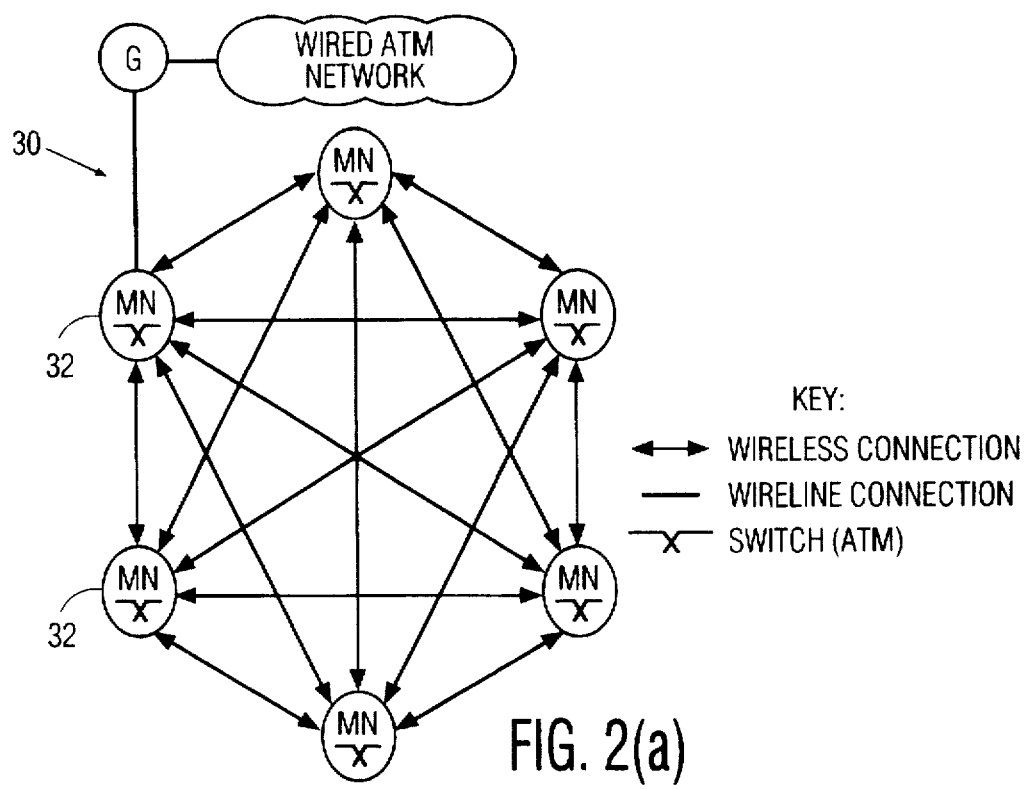
FIG. 2(a) and 2(b) illustrate a wired ATM local area network having a distributed (ad-hoc) architecture in a fully-connected topology (FCT) and a forwarding-node topology (FNT), respectively.
Figure 2B:
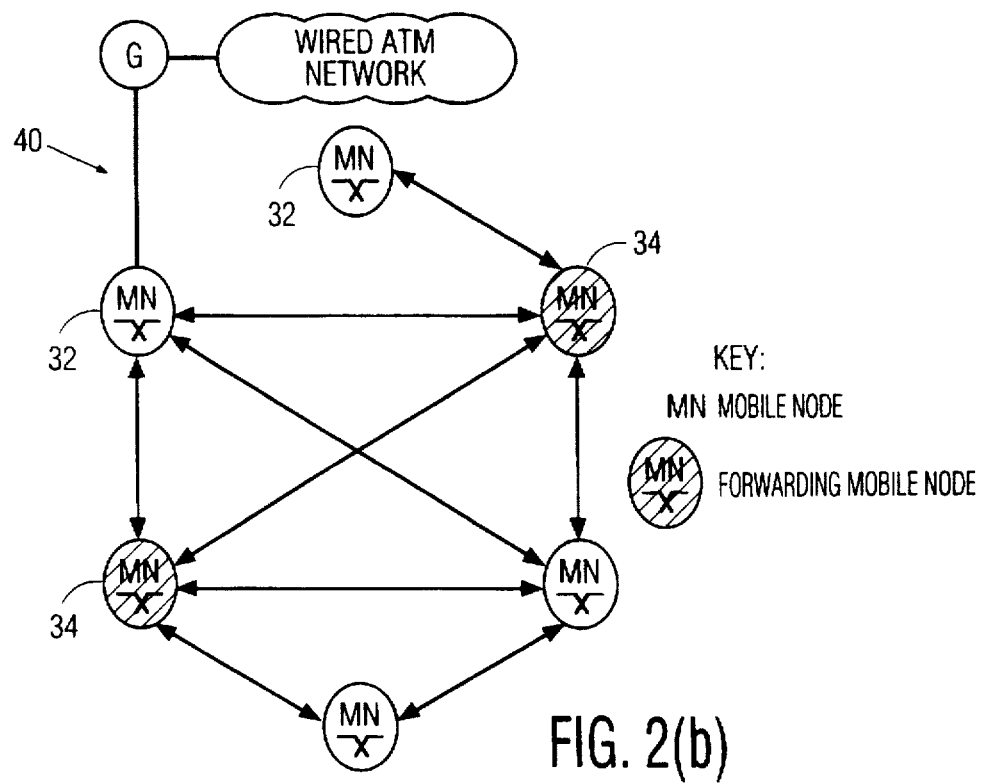

A reservation-based MAC protocol according to the present invention is considered for two distinct types of network architectures, namely, the centralized (base-station-based) architecture and the distributed (ad-hoc) architecture. Specifically, in the centralized architecture, both control and data channels are implemented in the centralized mode. In the distributed architecture, the control channel is implemented in either the distributed or the centralized mode and the data channel is preferably in the distributed mode. A centralized control channel in a distributed network architecture may be preferable based on a significant simplification of the MAC layer protocols, which may then be incorporated within every device with a method of choosing a "current" central controller. It is also possible that a centralized control facility in a distributed architecture may be implemented which is less expensive than a distributed control facility, and hence, both centralized and distributed control scenarios for the distributed architecture are discussed herein below.

In accordance with the present invention, with respect to a distributed (ad-hoc) architecture, the control channel or the data channel of the ATM network can be implemented in either a centralized or a distributed mode. When the control channel is implemented in a centralized mode, all control messages from mobile users (i.e., MNs) must be sent to a designated central controller where control actions are determined and transmitted back to the user. In contrast, for a distributed control channel, no central controller is used and all control functions are distributed among the mobile users (i.e., MNs). In this later case, it is important to maintain a consistent control database among all of the mobile users. When the data channel is implemented in a centralized mode, transmission of packets between two users must be done through a designated central node. For a distributed data channel, no central node is assigned and transmission of packets between two users is done directly. In this later case of a distributed data channel, it is not necessary to transmit packets from the transmitter to a central node and then from the central node back to the receiver, thereby making efficient use of valuable total wireless system bandwidth and thus consequently not wasting the same.

In a preferred embodiment, the control channel is implemented in a centralized mode and the data channel is implemented in a distributed mode. That is, in the preferred embodiment, the reservation-based MAC protocol, to be discussed further herein below, forces the control channel to be centralized while the data channel is distributed. Such a reservation-based MAC protocol advantageously provides a more reliable access control and further provides data transmission having high reliability and high data transmission throughput.

An essential idea according to the method and apparatus of the present invention is two-fold. That is, first, to split all MAC-based communications within a control channel and the data channel in a reservation based scheme via a control data superframe (CDS), and, second, using the control channel, to be able to allocate a nominal bandwidth to every user (i.e., MN or MT) on a first-come-first-served basis until a maximum bandwidth allocation for the system is reached. To ensure that different ATM services are possible, at the moment of transmission, an actual allocation of bandwidth is requested by each MN requiring ATM service. Thus, there are two methods of allocation—one long-term (referred hereinafter as "call-level allocation") and another short-term or immediate allocation (referred hereinafter as "slot-level allocation").

An advantage of the present invention is that the reservation-based MAC protocol is independent of the assumption of whether a distributed or a centralized architecture is used. As will be discussed hereinbelow, with minor modifications, the MAC protocol according to the present invention can be used for both centralized and distributed architectures.

Figure 3:
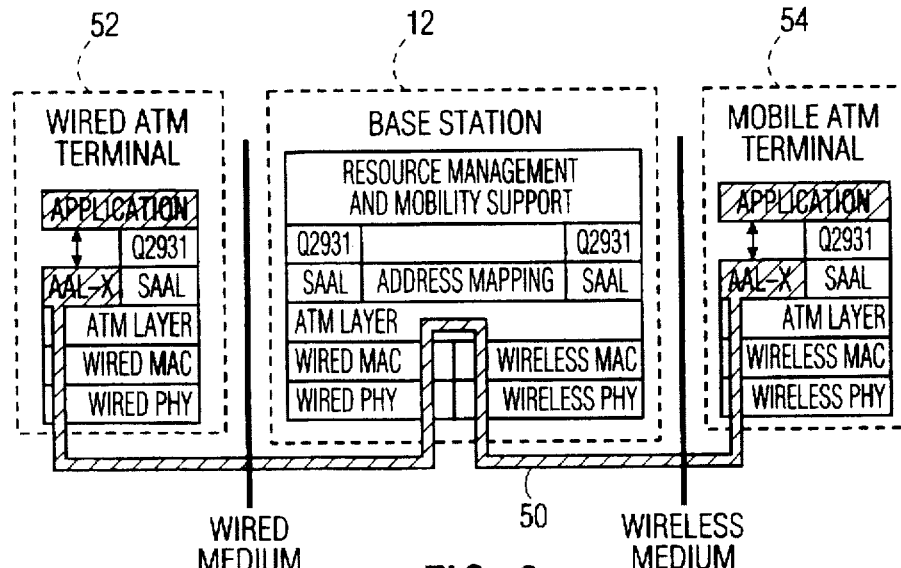
FIG. 3 shows a wired/wireless ATM layered model for centralized (base-station-based) architectures having a medium access control (MAC) layer using a reservation-based protocol according to the present invention.

To place the Medium Access (MAC) protocol in perspective, a layered model for a wireless-ATM system with centralized architecture is shown in FIG. 3. Layered models, including various named layers as shown, are known in the art and thus only briefly described herein. At the base station 12, ATM switching is performed and resource and mobility management are handled. Using separate MAC and PHY (physical) layers, the base station 12 can handle both wired-ATM traffic and wireless-ATM traffic as shown by the "shaded" application path 50 between a wired-ATM terminal 52 and a mobile ATM terminal 54 in FIG. 3.

In regard to earlier discussion herein about the control and the data channels, the ATM layer is concerned only with the data channel and not with the control channel. In the layered model, the layer below does not know the layer above. It is the wireless MAC layer which essentially specifies how the user interacts with the control channel. Once a reservation is made for a particular amount of channel bandwidth, ATM cells from the output of the ATM layer are sent over the wireless channel. The "wireless control and management function" resides inside the "resource management and mobility support" block. Although not shown in the figure, the "ATM control and management function" interworks with the wireless control and management function, which, in turns, can communicate with the wireless MAC and PHY layers. This information exchange, as briefly discussed, is required to setup and tear down wireless physical connections, which is usually never done for a wired link. Mobility management also falls within this aspect, which is not further dealt with herein.

Figure 4:
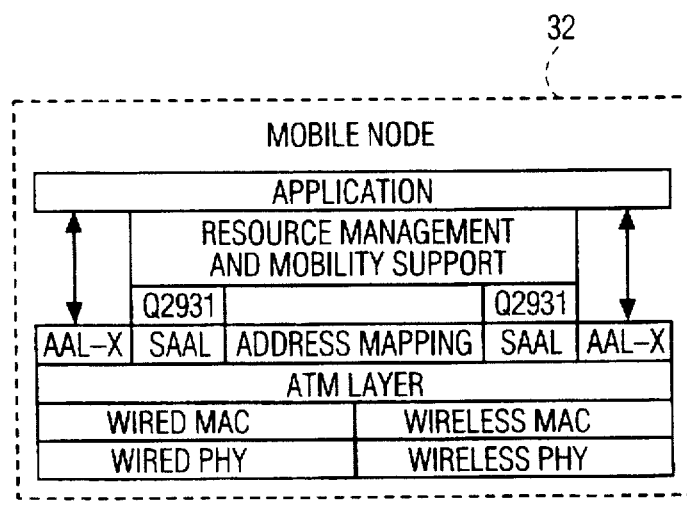
FIG. 4 shows a wired/wireless ATM layered model for distributed (ad-hoc) architectures having a medium access control (MAC) layer using a reservation-based protocol according to the present invention.

In the distributed (ad-hoc) architecture, the layered model for each of the mobile nodes (MNs) is similar to that for the base station (BS) in the centralized scenario, except that the mobile node has to handle applications as well. The layered model for the mobile node of the distributed (ad-hoc) architecture is shown in FIG. 4.

With the above discussion regarding the location of the MAC layer, we can now discuss the implementation of the MAC layer in detail. Note that for the MAC reservation-based communications protocol according to the present invention, it is not necessary to follow exactly the layering as discussed above.

According to the present invention, several basic assumptions for the MAC reservation-based protocol are made. In particular, these basic assumptions are made for the wireless ATM network. They include the following:

1. QoS must be guaranteed.
2. A wide variation in data rates is expected, for example, from several Kbps (kilo bits per second) to several tens of Mbps (mega bits per second).
3. Both asynchronous (e.g., for file transfer) and isochronous (e.g., for video) services must be supported.
4. ATM cells address many different receivers. These ATM cells are further multiplexed randomly. It is not known to the MAC layer which packets address which user, although it is possible to specify some local neighborhood information about the packet to the MAC layer.
5. A user cannot both transmit and receive at the same time.
6. A known preamble must be sent by every transmitter to let the receiver equalizer adapt to the channel. The preamble is part of the transmitter turnaround time—which is the time it takes for a transmitter to stop transmission and another transmitter to start transmission.
7. The unit of information transfer is assumed to be an ATM cell and additional overhead of any other layers. This unit is called an ATM slot.

In an ATM network, time slots are allotted for control purposes and data purposes. That is, essentially, any control or data packets are viewed as occupying time slots.

Figure 5:
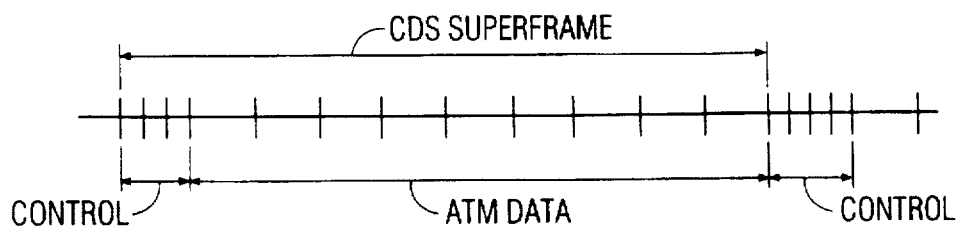
FIG. 5 shows a control-data superframe (CDS) of the medium access control (MAC) layer using a reservation-based protocol according to the present invention.

In accordance with the present invention, a concept of a Control-Data Superframe (CDS) shall now be discussed. As mentioned earlier hereinabove, one aspect of the MAC protocol is a reservation-based policy, wherein, during the control phase, a certain number of ATM slots are reserved for a particular user. A Control-Data Superframe (CDS) is herein defined as consisting of a single control sequence followed by a data sequence. During the control sequence, multiple users (i.e., MNs or MTs) specify and request a number of ATM slots required for each of their respective use. Once this request is successful, each user then transmits its designated packets in a specified sequence during the data slots. The specified sequence is determined in accordance with an outcome of the control sequence. Hence, multiple-access methods are used only during the control sequence with no contention over the data slots. The throughput of this method is based upon the ratio between the size of the data slots required to the total size of the superframe. A CDS frame is shown in FIG. 5.

With respect to the CDS frame, the number of data slots is allowed to be variable up to a maximum number. Similarly, the number of control slots are also variable up to a maximum number. The specific number of data slots and control slots for the data channel and the control channel, respectively, must be determined by realistic traffic studies within a wireless network. Note also that there will be a transmitter turnaround time associated with every user that transmits during a CDS. It is assumed that the transmitter turnaround time is a submultiple of an ATM slot.

There are essentially three kinds of users in an ATM network. The following definitions and terminology are provided herein below for further use and understanding, which include:

1. Dormant Users (DU) and Networked Users (NU): among all possible users, there will always be some users who are connected to the wireless network at a specific time—these users are termed Networked Users (NU). The users which are not NU are called Dormant Users (DU).
2. Inactive Networked Users (INU): among all NU, there are users who currently have no data to send, or cannot send data because the network is fully loaded. These users are termed INU.
3. Active Networked Users (ANU): finally among all NU, those users which have been allocated a specific connection are termed ANU.

Figure 6:
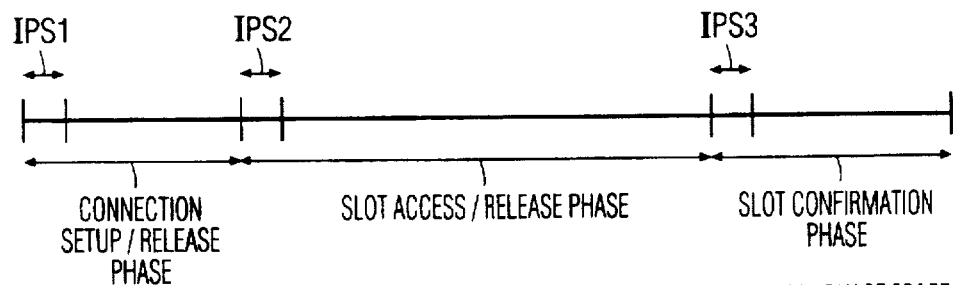
FIG. 6 illustrates the control frame of the CDS frame in accordance with the present invention.

Turning now to FIG. 6, a control frame (i.e., the control channel) for use in the present invention shall be described. The control frame is composed of a number of phases, preferably to include, at a minimum, three phases as shown in FIG. 6. The three phases include a Connection Setup/Release Phase, a Slot Access/Release Phase, and a Slot Confirmation Phase. The Connection Setup/Release Phase is used for call-level allocations (i.e., long term allocations), whereas, the Slot Access/Release and Slot Confirmation Phases are used for slot-level allocations (i.e., short term allocations). A central controller allocates/arbitrates data slots for the data channel for each requested service. Each phase of the control frame can be of variable length, depending upon the number of MN users requesting service, up to a prescribed maximum as determined by overall system requirements. The control frame (i.e., control channel) within the CDS thus includes a minimum of three phases, and may include further phases or combinations of phases. Functionalities have to be done in some prescribed order, as determined, for example by the overall system requirements. The end of a given phase can be specified by an occurrence of no signal having been transmitted between an inter-phase space (IPS)—such as similarly used in the IEEE 802.11 standard, where an inter-frame space (IFS) is defined instead of an IPS. Note that it may not be required to have IPS1 or IPS3, as shown in FIG. 6, if it is accurately known by every user (i.e., MN or MT) of the ATM LAN as to when the data channel ends and when the slot access/release phase of the control channel is over.

Each of the phases of the control frame shall now be described in further detail. In the connection setup/release phase, a guarantee of reserved bandwidth is effectuated. As discussed above, a method of reserving bandwidth over one CDS has been described. However, for ATM, it is necessary to provide reserved bandwidth over multiple CDS, i.e., the MAC protocol must have memory. The later is ensured by the following technique. First the control frame has multiple phases of operation. During the connection-setup phase, a nominal number of ATM slots are requested within every CDS for each MN or MT, for example, two slots/frame. These nominal slots are essentially allocated to each particular user and are further noted by other users in the network. To ensure that a user does not take over the entire bandwidth, an upper limit is preferrably specified on the total number of nominal slots that an one user can reserve (which should be less than the maximum number of ATM slots in a CDS). In addition, in implementing the medium access control (MAC) layer using a reservation-based communications protocol, the control channel further allocates bandwidth on a priority basis. The priority basis can include a first-come-first-served basis. Alternatively, the priority basis may include a priority level basis. Furthermore, the priority basis may occur during the connection-setup phase and/or the slot allocation phase, as appropriate.

In the connection-setup phase, when the user does not need the nominal slots, a connection release request is used to free the reserved bandwidth. Alternatively, a user may wish to change his reservation request, which can also be done during the same phase. Note that for available-bit-rate (ABR) applications, no connection setup/release should be required. However, for the purposes of simplification of the MAC protocol, it will be required that a connection setup request of "zero" packets should be requested by an ABR user. This simplifies the next phase as described herein below. In general, a connection setup/release request can be assumed to be a relatively infrequent event. Many suitable known multiple-access techniques can be used to determine whether the request was indeed successful.

In connection with the Slot Access/Release Phase an optimization of a specific CDS takes place. The particular specific CDS frame for which an optimization takes place may include either a current CDS frame or a subsequent CDS frame. Clearly, even though a nominal number of slots are reserved for every ANU in a CDS, there is a high possibility in ATM, especially with variable-rate sources that not all slots in a given CDS will be used, or more slots than the nominal are required. Hence, after the connection setup/release phase, all ANUs (even ABR sources must be allocated a connection) go into the slot access/release phase. Here, since all the users who have been allocated a connection (ANUs) are already known to the network, a deterministic method can be used to essentially poll each of the ANUs as to what is the total number of packets that it desires in the current CDS. There is no necessity to use multiple-access techniques for the implementation of the slot access/release phase.

In the slot access/release phase of the control phase of the CDS frame, there is a possibility that more resources may be requested than specified by the maximum possible number of ATM slots in a CDS. Hence, there is a need to arbitrate between the actual allocated slots for the ANUs so that a consistent assignment can be advantageously maintained. Such an arbitration takes place during the slot confirmation phase of the control phase of the CDS frame. The specific method of arbitration depends highly on whether centralized or distributed control is used. The slot confirmation phase implements a priority basis for short term strategy allocation corresponding to the slot access/release phase. Thus, the slot confirmation phase provides an arbitration of an actual allocation of ATM data slots between all ANUs for a specific CDS frame. The particular specific CDS frame for which a slot confirmation takes place may include either a current CDS frame or a subsequent CDS frame.

MAC PROTOCOLS for DISTRIBUTED ARCHITECTURES

We shall now turn our attention to MAC protocols for distributed (ad-hoc) architectures. As discussed earlier, there are two types of topology for a distributed (ad-hoc) architecture, namely, FCT (fully connected topology) and FNT (forward node topology). In the following, the discussion mostly assumes an FCT. The FNT architecture issues are described later.

In the distributed architecture having a FCT topology, the data channel is assumed to be implemented in a distributed mode. However, the control channel can be implemented in either a centralized or a distributed mode as discussed below.

Centralized Control Mode

In a centralized control scenario, one mobile node W among all mobile nodes (MNs) is designated as the central controller. Note that the MN acting as the central controller may not be an ANU, but must necessarily be an INU. The central controller provides arbitration among the different demands of the various users and can use one of many suitable known algorithms based on priority of data, current user nominal allocation, fairness strategies, etc. to allocate bandwidth. After the central controller determines the exact allocation, it informs all of the ANUs of the specified allocation for each.

The selection of a central controller can be implemented in a distributed fashion. For example, the first node to turn on or power up can become a central controller. If that particular node fails, then the next node that turned on or powered up could become the central controller, and so on. Another suitable algorithm for selecting a central controller could be based on topology information within every node such that a central controller is one which is at the "center" of the coverage area in a received power sense. Note that this later configuration does require that the centralized control algorithms be implementable on any node, which can be expensive if extremely complicated algorithms are used.

Distributed Control Mode

In a distributed control scenario, the slot access/release phase provides an opportunity for all ANUs to specify any non-used or additional number of slots required in the subsequent data frame. By associating each additional slot-request with a priority and a random number, the non-used slots can automatically be allocated among the "requested" users according to their priority levels and the values of the random numbers. A unique slot assignment among ANUs can then be obtained.

Given this later slot assignment, one of two possibilities exist. It can be assumed that a particular slot assignment will be determined uniquely by all the ANUs in a distributed manner, and hence there is no reason to transmit a final slot assignment. However, there is always a possibility that a given ANU may not have the correct parameters of the algorithm, or use the same distributed algorithm. Thus, it is then desirable for some nodes to reinforce this slot assignment by some node. This could be accomplished by randomly choosing an ANU from all the ANUs that currently are involved in the slot determination process. It is imperative that an ANU follow this Particular slot assignment, even though its own algorithm may specify a different assignment.

The performance of the centralized control algorithm can be expected to be superior to that of a distributed control algorithm. Furthermore, the central controller can also implement some "policing" algorithms as well. The centralized control algorithm may, however, be more expensive to implement since every node (MT or MN) must have the capability to implement the centralized algorithm (so that flexibility, and plug-and-play requirements are met).

Figure 7:
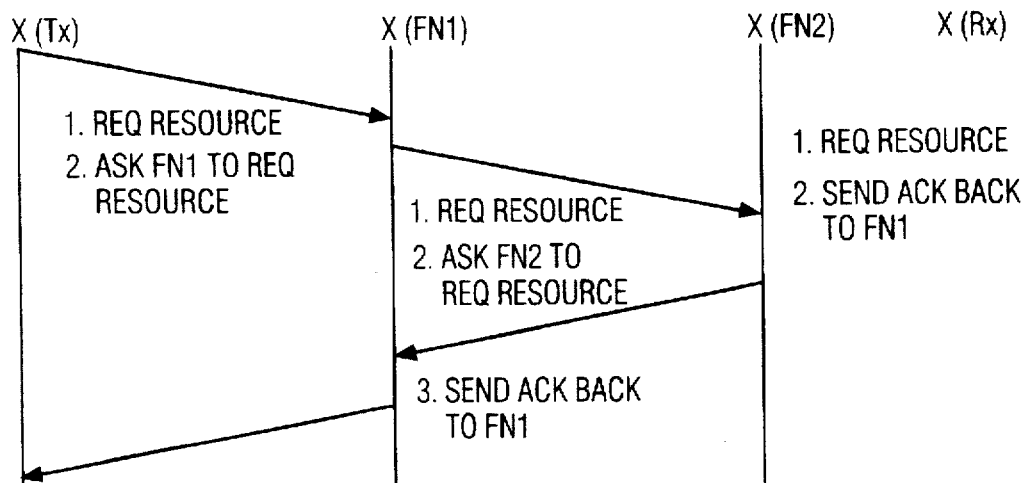
FIG. 7 illustrates an ATM connection for an forwarding node topology of a distributed architecture in connection with the medium access control (MAC) layer using a reservation-based protocol according to the present invention.

Referring now to FIG. 7, an ATM connection setup in an FNT (Forwarding Node Topology) shall now be discussed. Whereas the above discussion implicitly assumed an FCT (fully-connected topology), to set up an ATM connection across an FNT, reservation must be made on all forwarding nodes, and an acknowledgment must be received by the transmitter. This later setup is assumed to be done by the ATM control/network management plane as shown in FIG. 7. In this manner, all resources are advantageously determined and allocated prior to a data transmission.

Referring still to FIG. 7, for instance, the transmitter (Tx) first determines from its topology description that to transmit to a receiver (Rx), it (Tx) must send its packets through forwarding node FN1. Tx then reserves the required bandwidth and sends an ATM control packet to the node FN1. Node FN1 determines that to send the packet to receiver (Rx), it must go through forwarding node FN2. Finally, node FN2 reserves a required bandwidth, and when FN2 is successful, sends an ATM control packet indicating acknowledgment of the desired connection. Node FN1 then sends back an acknowledgment (CONNECT) packet back to the transmitter Tx and hence the connection between Tx and Rx is setup as shown.

MAC PROTOCOLS for CENTRALIZED ARCHITECTURES

We shall now turn our attention to MAC protocols for centralized (base-station-based) architectures. As discussed herein above, there are two types of topologies for a centralized (base-station-based) architecture, namely, tree topology and ring topology. These two topologies share a common property, that is, all switching and control functions are done in the base stations (BS) and/or the mobile switching center (MSC). Without loss of generality, the discussion to follow focuses on a simple case wherein the centralized network consists of only one base station serving a number of mobile terminals (MT). The base station is also connected to a wired-ATM network via a gateway (G). The design philosophy of the MAC protocol for the centralized architecture is to use the same concept as the centralized control in the distributed architecture so that most parts of the MAC protocol can be used in both centralized and distributed architectures.

Centralized Control and Data Channels

Both control and data channels are assumed to be implemented in a centralized mode. In this case, communications between MTs within the same cell are made through the BS. Control and data messages are first transmitted from a MT to a BS (called the up-link) and then echoed back to another MT from the BS (called the down-link) in a broadcast fashion. As explained earlier, this "ping-pong" action may waste some of the valuable bandwidth in the wireless medium. Nevertheless, the mechanism of control and data transfer in this case is much simpler than in the distributed case.

Figure 8:
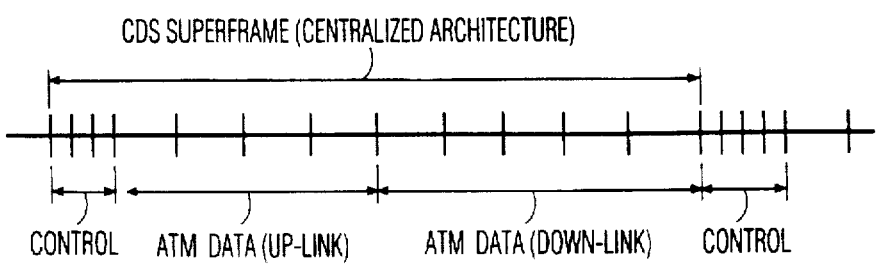
FIG. 8 illustrates the control frame of the CDS frame for a centralized architecture in accordance with the present invention.

Like the distributed architecture, the reservation-based MAC protocol for the centralized architecture is based on a CDS superframe which consists of a control frame (i.e., control channel) and a data frame (i.e., data channel). In the centralized architecture, the data frame is further divided into an "up-link" data frame and an "down-link" data frame. See FIG. 8.

The mechanism of the control and "up-link" data frames is similar to that in the centralized control in the distributed architecture. Instead of using a mobile node (MN) as a designated central controller, the central controller always resides in the base station (BS). In the control frame, mobile terminals (MTs) negotiate the QoS requirements and perform all connection setup/release and slot access/release with the BS. Once, the slot-allocation in the current CDS has been determined, the BS will broadcast this allocation to all MTs via the slot confirmation phase in the control frame. Accordingly, the MTs can send data to the BS in the "up-link" data frame. All the received up-link data will pass to the ATM layer of the BS ATM switch. Switching and multiplexing will then be done. Data belonging to the wired-ATM network or other BS (in case of multiple-cell network) will then be switched accordingly. Other data addressed to MTs in the same cell will multiplex with data from the wired-ATM network or other BS and, subsequently, broadcast to all MTs in that cell during the "down-link" data frame.

In addition to the various advantages of centralized control in the distributed architecture, more sophisticated multiplexing and switching can be done in the BS as well. Nevertheless, a major drawback of a centralized architecture is the vulnerability to the failure of the BS. That is, in the case of BS failure, no communications among MTs can be made.

Thus there has been described a method and apparatus for implementing a reservation-bases wireless asynchronous transfer mode local area network and, in particular, the methodology behind the MAC protocol. Essentially, to guarantee a QoS over a wireless ATM framework, a reservation-based policy has been implemented in which there are two phases, a control phase and a data phase. During the control phase, reservations are made. During the data phase, the actual data for carrying out the services as requested by a MN or MT is transmitted. The MAC protocol according to the present invention is furthermore architecture independent, i.e., it can be implemented in a wireless ATM LAN having a centralized architecture or a distributed architecture. In particular, the control phase of the CDS frame is similar for each architecture. Still further, a MN or MT embodying the MAC protocol according to the present invention is also advantageously interchangeable for use in either a centralized or distributed architecture wireless ATM LAN.

During the control phase, several phases are implemented. To guarantee a certain bandwidth, a nominal number of packets can be reserved in the connection setup/release operation. The nominal reservation may not optimize allocation. Hence, a slot access/release function is performed. To guarantee that everybody understands what allocation was finally decided upon, a slot-confirmation stage is further added within the control phase. Based on the concept thus described, MAC protocols for both distributed and centralized architectures have been devised.

While the invention has been particularly shown and described with reference to the preferred embodiment thereof, it will be understood by those skilled in the art that various changes in form and detail may be made therein without departing from the spirit and scope of the invention. For example, when referring to an MN or MT, as used herein, the same are interchangeable depending upon the specific architecture being used. Also, while the connection setup/release phase, slot access/release phase, and the slot confirmation phase have been shown as occupying adjacent sections of time, it is possible to rearrange these phases without departing from the spirit of the present invention.

What is claimed is:

1. A method for implementing a reservation-based wireless asynchronous transfer mode (ATM) local area network (LAN), said method comprising the steps of:

a) providing a system architecture of mobile nodes (MNs), each MN for communicating with other MNs of the system architecture;

b) supporting a plurality of services, each service having respective quality-of-service (QoS) requirements; and c) implementing a medium access control (MAC) layer using a reservation-based communications protocol, wherein the protocol (i) divides all MAC-based communications between a control channel and a data channel, wherein the control channel and the data channel together comprise a control-data superframe (CDS) and (ii) utilizes the control channel for allocating a bandwidth of the data channel to each service, the control channel having a control frame during which an allocation of data payload slots of the data channel is determined according to (a) a long-term strategy corresponding to a time of service required to complete a service over multiple CDS frames and (b) a short-term strategy within a CDS frame corresponding to instantaneous data payload slot requirements for a particular service, thereby achieving respective QoS requirements of each service.

2. The method of claim 1, wherein the step of providing a system architecture of MNs comprises providing a centralized architecture.

3. The method of claim 1, wherein the step of providing a system architecture of MNs comprises providing a distributed architecture.

4. The method of claim 3, wherein the control channel is implemented in a centralized mode and the data channel is implemented in a distributed mode.

5. The method of claim 1, where in the step of implementing a medium access control (MAC) layer using a reservation-based communications protocol, the control frame of the control channel includes a connection setup/release phase, a slot access/release phase, and a slot confirmation phase.

6. The method of claim 5, further wherein during the connection setup/release phase of the control channel, a respective nominal number of ATM slots having been previously reserved and allocated to each MN and further noted by other MNs of the network, each MN user having an ability to further request a reservation for an additional number of ATM slots according to the QoS requirements of a respective service, wherein a MN user requesting service is considered an active network user (ANU), and in an instance in which a MN user no longer requires a previously reserved number of ATM slots for a particular service, a connection release request is used to free the bandwidth corresponding to the previously number of reserved ATM slots;

during the slot access/release phase, all ANUs are polled in a deterministic manner to determine a total number of ATM slots that a respective ANU desires in a specific CDS frame, and during the slot confirmation phase, an actual allocation of ATM slots is arbitrated between all ANUs for a specific CDS frame.

7. The method of claim 6, still further wherein during the connection setup/release phase of the control channel, an upper limit is specified on a total number of ATM slots that any one MN user may reserve during a single CDS frame.

8. The method of claim 6, still further wherein during the slot access/release phase, the specific CDS frame includes a CDS frame selected from the group consisting of a current CDS frame and a subsequent CDS frame, and during the slot confirmation phase, the specific CDS frame includes a CDS frame selected from the group consisting of a current CDS frame and a subsequent CDS frame.

9. The method of claim 1, where in the step of implementing a medium access control (MAC) layer using a reservation-based communications protocol, the control channel further allocates bandwidth on a priority basis.

10. The method of claim 9, wherein the priority basis is a first-come-first-served basis.

11. The method of claim 9, wherein the priority basis is a priority level basis.

12. The method of claim 1, wherein the protocol further utilizes the control channel for allocating a bandwidth of the data channel to each service such that a total bandwidth allocation is not more than a maximum network bandwidth allocation.

13. A reservation-based wireless asynchronous transfer mode (ATM) local area network (LAN) comprising:

a) a system architecture of mobile nodes (MNs), each MN for communicating with other MNs of the system architecture;

b) means for supporting a plurality of services, each service having respective quality-of-service (QoS) requirements; and c) means for implementing a medium access control (MAC) layer using a reservation-based communications protocol, wherein the protocol (i) divides all MAC-based communications between a control channel and a data channel, wherein the control channel and the data channel together comprise a control-data superframe (CDS) and (ii) utilizes the control channel for allocating a bandwidth of the data channel to each service, the control channel having a control frame during which an allocation of data payload slots of the data channel is determined according to (a) a long-term strategy corresponding to a time of service required to complete a service over multiple CDS frames and (b) a short-term strategy within a CDS corresponding to instantaneous data payload slot requirements for a particular service, thereby achieving respective QoS requirements of each service.

14. The reservation-based wireless ATM LAN of claim 13, wherein said system architecture of MNs comprises a centralized architecture.

15. The reservation-based wireless ATM LAN of claim 13, wherein said system architecture of MNs comprises a distributed architecture.

16. The reservation-based wireless ATM LAN of claim 15, wherein the control channel is implemented in a centralized mode and the data channel is implemented in a distributed mode.

17. The reservation-based wireless ATM LAN of claim 13, wherein the control frame of the control channel of said means of implementing a medium access control (MAC) layer using a reservation-based communications protocol includes means for implementing a connection setup/release phase, a slot access/release phase, and a slot confirmation phase.

18. The reservation-based wireless ATM LAN of claim 17, further wherein the connection setup/release phase of the control channel includes means for processing each MN user reservation request for an additional number of ATM slots according to the QoS requirements of a respective service, wherein a respective nominal number of ATM slots is previously reserved and allocated to each MN and further noted by other MNs of the network, wherein a MN user requesting service is considered an active network user (ANU), and in an instance in which a MN user no longer requires a previously reserved number of ATM slots for a particular service, the connection setup/release phase of the control channel further includes means for providing a connection release request to free the bandwidth corresponding to the previously reserved number of ATM slots;

the slot access/release phase of the control channel includes means for polling all ANUs in a deterministic manner to determine a total number of ATM slots that a respective ANU desires in a specific CDS frame, and the slot confirmation phase of the control channel includes means for arbitrating an actual allocation of ATM slots between all ANUs for a specific CDS frame.

19. The reservation-based wireless ATM LAN of claim 18, still further wherein the connection setup/release phase implementation means specifies an upper limit on a total number of ATM slots that any one MN user may reserve during a single CDS frame.

20. The reservation-based wireless ATM LAN of claim 13, wherein the control channel of said means for implementing a medium access control (MAC) layer using a reservation-based communications protocol further allocates bandwidth on a priority basis.

21. The reservation-based wireless ATM LAN of claim 20, wherein the priority basis is a first-come-first-served basis.

22. The reservation-based wireless ATM LAN of claim 20, wherein the priority basis is a priority level basis.

23. The reservation-based wireless ATM LAN of claim 13, wherein the protocol further utilizes the control channel for allocating a bandwidth of the data channel to each service such that a total bandwidth allocation is not more than a maximum network bandwidth allocation.

24. A mobile node (MN) for use in a reservation-based wireless asynchronous transfer mode (ATM) local area network (LAN) as claimed in claim 13.

25. A mobile node (MN) for use in a reservation-based wireless asynchronous transfer mode (ATM) local area network (LAN) having a system architecture and supporting a plurality of services, each service having respective quality-of-service (QoS) requirements, said mobile node comprising:

a medium access control (MAC) layer using a reservation-based communications protocol, wherein the protocol (i) divides all MAC-based communications between a control channel and a data channel, wherein the control channel and the data channel together comprise a control-data superframe (CDS) and (ii) utilizes the control channel for allocating a bandwidth of the data channel to each service, the control channel having a control frame during which an allocation of data payload slots of the data channel is determined according to (a) a long-term strategy corresponding to a time of service required to complete a service over multiple CDS frames and (b) a short-term strategy within a CDS corresponding to instantaneous data payload slot requirements for a particular service, thereby achieving respective QoS requirements of each service.

26. The mobile node (MN) of claim 25, further wherein said MN is interchangeable between use in a reservation-based wireless ATM LAN having a centralized system architecture and use in a reservation-based wireless ATM LAN having a distributed system architecture.

* * * * *